W. P. SMITH.
GLOBE MAP.
APPLICATION FILED AUG. 7, 1918.
1,302,602.
Patented May 6, 1919.
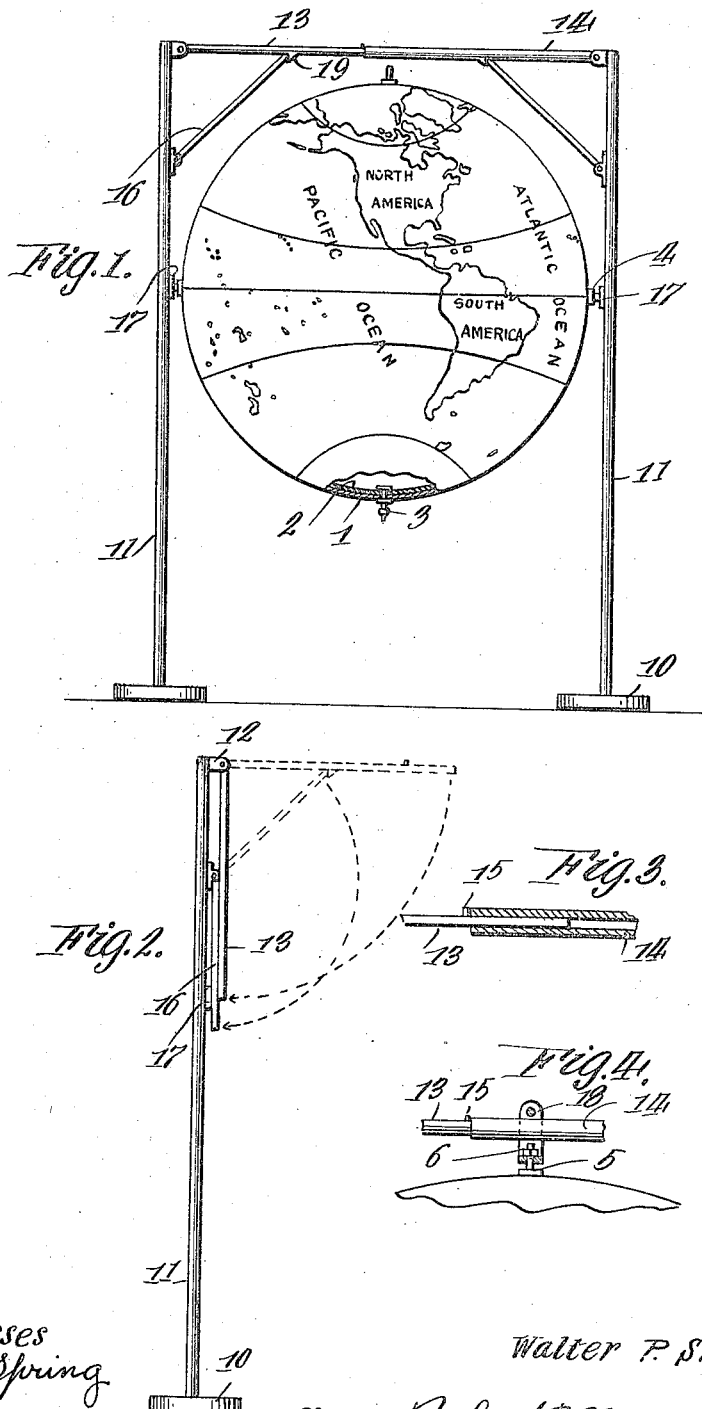
Witnesses
Guy M. Spring
N. L. Collamer
Inventor
Walter P. Smith
By Richard B. Owen
Attorney

UNITED STATES PATENT OFFICE.

WALTER P. SMITH, OF REFORM, ALABAMA.

GLOBE-MAP.

1,302,602.　　　　　Specification of Letters Patent.　　　Patented May 6, 1919.

Application filed August 7, 1918.　Serial No. 248,748.

*To all whom it may concern:*

Be it known that I, WALTER P. SMITH, a citizen of the United States, residing at Reform, in the county of Pickens and State of Alabama, have invented certain new and useful Improvements in Globe-Maps, of which the following is a specification.

This invention relates to educational appliances, and more especially to globes; and the object of the same is to produce an improved collapsible globe and an improved support for the same.

The globe is by preference of canvas or other fabric lined with rubber, and it has an inflating nipple at the bottom.

The support is by preference made in two parts which may be folded into small compass for storage and which when distended will telescope on each other at the top so as to support the globe, the latter being of ample size so as to show many of the fine features of the map on its surface.

Details are set forth below, and reference is made to the drawings, in which:—

Figure 1 is an elevation of this globe and its support,

Fig. 2 is an elevation of one of the two parts of the support folded,

Fig. 3 is a sectional detail showing the upper bars of the supports where they telescope, Fig. 4 is a detail showing how the globe may be held at its pole instead of at its equator.

The globe itself is preferably made of canvas or the like, 1, with a lining of rubber 2 or the like so as to make it air-tight, and the numeral 3 in Fig. 1 designates a nipple at the south pole through which air is forced into the interior to distend this globe. The latter I have made quite ample in size, and in fact it might be five or six feet in diameter, so that the map which is inscribed on the surface of the globe can contain all the data necessary to show. At diametrical points on the equatorial line I provide trunnions 4. At the north pole I provide a headed member 5 which is shown in Fig. 4 as a bolt having a nut 6. These various elements permit the globe to be supported selectively as will yet be described.

The support is in two parts, each comprising a base 10, a standard 11 having a pair of ears 12 at its upper end, and a top bar pivoted between said ears. The top bar 13 of one part is shown in Fig. 1 as solid, and the other top bar 14 is shown as tubular so that these bars may telescope as best seen in Fig. 3, a pin 15 on the solid bar preventing them telescoping too far. Pivoted to each standard 11 is a brace 16 which may be turned upward and engage with a stop 19 in the top bar as seen in Fig. 1, or may hang pendant and out of the way as seen in Fig. 2. Each standard also has a bearing 17 in which one of the trunnions 4 may be removably mounted. A clip 18 may be removably engaged with the top bar as seen in Fig. 4 to receive the headed member 5 when the globe is hung therefrom, and at this time the trunnions will not be engaged with the bearings if it is desired to rotate the globe, or they may be left engaged therewith if preferred.

The parts are shown in Fig. 1 as set up, and the device is of such size that those who use the globe can pass completely around it and read the inscriptions on its map. When not in use, the globe is detached from the support and the latter folded and stood in the corner or perhaps packed away in the closet, and the globe is deflated and may be stored in small compass. Of course a globe of such ample size might be supported from overhead or by another form of framework, but the fact that it is so large that it probably may not be permitted to remain constantly in the school room, requires a support of some kind which can be collapsed when the globe shall be deflated.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In an educational globe, the combination with a globe proper, a headed member rising from its north pole, and trunnions projecting from diametrically opposite points on its equator; of a skeleton structure including two standards and a cross bar connecting them above the globe, bearings on the standards for said trunnions, and a clip on the cross bar for said headed member, the bearings and trunnions or the clip and member being employed selectively.

2. In a collapsible educational globe structure, the combination with the globe proper composed of flexible material, and means for inflating it at will; of a two-part foldable support whereof each part comprises a base, a standard, and a top bar pivoted to the standard, one top bar being solid and the other tubular whereby they may telescope on each other, and connections between the globe and the support.

3. In an educational globe, the combination with the globe proper composed of flexible material, and means for inflating it at will; of a two-part collapsible support whereof each part comprises a base, a standard, and a top bar pivoted to the standard, one top bar being solid and the other tubular whereby they may telescope on each other, a headed member rising from the top of the globe, and a clip carried by the support and in which said member is swivelly mounted.

4. The herein described educational globe comprising the globe proper and means for inflating it, a headed support rising from its north pole, a clip in which said support is swivelly mounted, and a skeleton structure for supporting said clip.

In testimony whereof I affix my signature in presence of two witnesses.

WALTER P. SMITH.

Witnesses:
P. MALONE,
S. K. DORROH.

Copies of this patent may be obtained for five cents each, by addressing the "Commissioner of Patents, Washington, D. C."